No. 746,489. PATENTED DEC. 8, 1903.
D. P. FUQUA, Sr. & F. C. BUEHLER, Jr.
ROTARY STEAM ENGINE.
APPLICATION FILED AUG. 25, 1903.
NO MODEL. 6 SHEETS—SHEET 2.

WITNESSES:
R. E. Hamilton.
M. L. Lange.

INVENTORS
D. P. Fuqua. Sr
F. C. Buehler. Jr
By Higdon & Higdon
Attys

No. 746,489. PATENTED DEC. 8, 1903.
D. P. FUQUA, Sr. & F. C. BUEHLER, Jr.
ROTARY STEAM ENGINE.
APPLICATION FILED AUG. 25, 1903.

NO MODEL. 6 SHEETS—SHEET 3.

WITNESSES:
R. E. Hamilton.
M. L. Lang.

INVENTORS
D. P. Fuqua, Sr.
F. C. Buehler, Jr.
By Higdon & Higdon
Attys.

No. 746,489. PATENTED DEC. 8, 1903.
D. P. FUQUA, Sr. & F. C. BUEHLER, Jr.
ROTARY STEAM ENGINE.
APPLICATION FILED AUG. 25, 1903.
NO MODEL. 6 SHEETS—SHEET 4.

WITNESSES:
R. E. Hamilton.
U. L. Lange.

INVENTORS
D. P. Fuqua. Sr.
F. C. Buehler. Jr.
By Higdon & Higdon
Attys

THE NORRIS PETERS CO., PHOTO-LITHO., WASHINGTON, D. C.

No. 746,489. PATENTED DEC. 8, 1903.
D. P. FUQUA, Sr. & F. C. BUEHLER, Jr.
ROTARY STEAM ENGINE.
APPLICATION FILED AUG. 25, 1903.
NO MODEL. 6 SHEETS—SHEET 5.
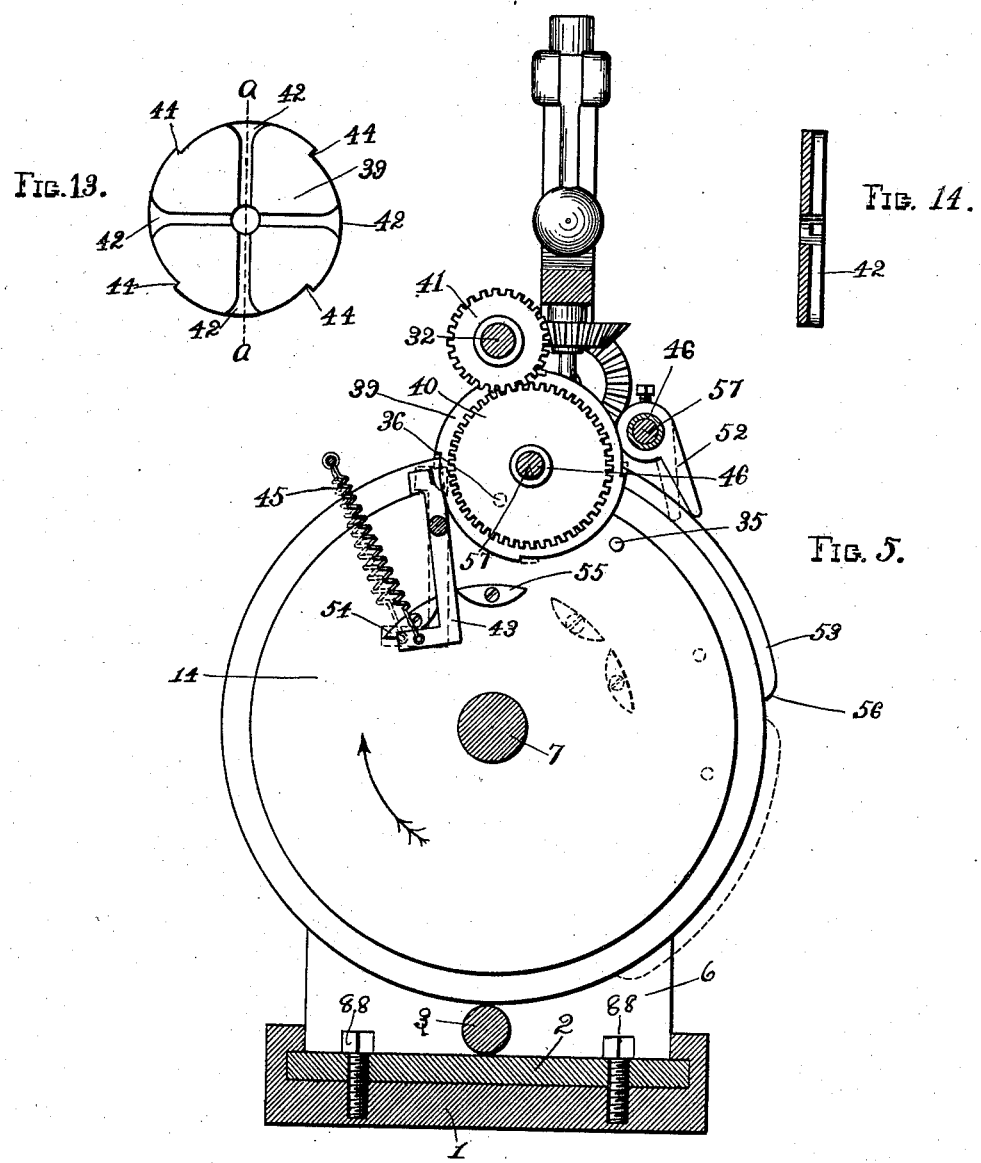
WITNESSES:
R. E. Hamilton.
U. L. Lange.
INVENTORS
D. P. Fuqua, Sr.
F. C. Buehler, Jr.
By Higdon & Higdon
Attys No. 746,489. PATENTED DEC. 8, 1903.
D. P. FUQUA, Sr. & F. C. BUEHLER, Jr.
ROTARY STEAM ENGINE.
APPLICATION FILED AUG. 25, 1903.
NO MODEL. 6 SHEETS—SHEET 6.
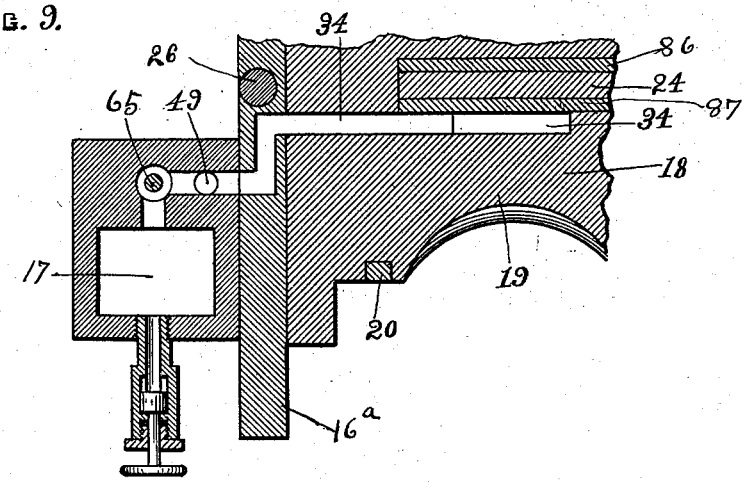
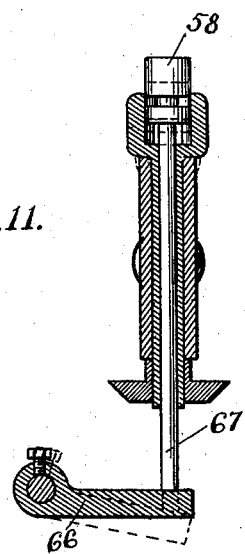
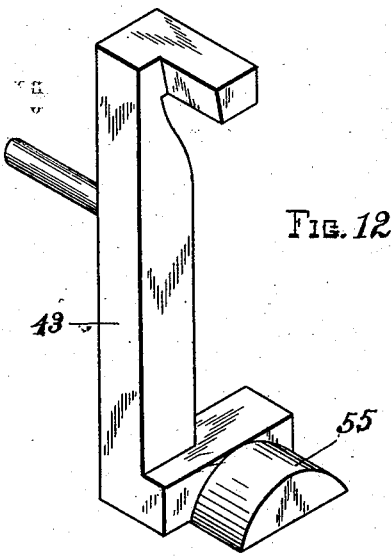
WITNESSES:
R. E. Hamilton.
M. L. Lange
INVENTORS
D. P. Fuqua, Sr.
F. C. Buehler, Jr.
By Higdon & Higdon
Attys No. 746,489. Patented December 8, 1903.

UNITED STATES PATENT OFFICE.

DAVID P. FUQUA, SR., AND FREDERICK C. BUEHLER, JR., OF KANSAS CITY, MISSOURI.

ROTARY STEAM-ENGINE.

SPECIFICATION forming part of Letters Patent No. 746,489, dated December 8, 1903.

Application filed August 25, 1903. Serial No. 170,737. (No model.)

*To all whom it may concern:*

Be it known that we, DAVID P. FUQUA, Sr., and FREDERICK C. BUEHLER, Jr., citizens of the United States, residing at Kansas City, in the county of Jackson and State of Missouri, have invented new and useful Improvements in Rotary Steam-Engines, of which the following is a specification.

Our invention relates to rotary steam-engines; and the object that we have in view in producing such an engine is its simplicity in construction, cheapness in manufacture, and its susceptibility of long duration.

Figure 1:
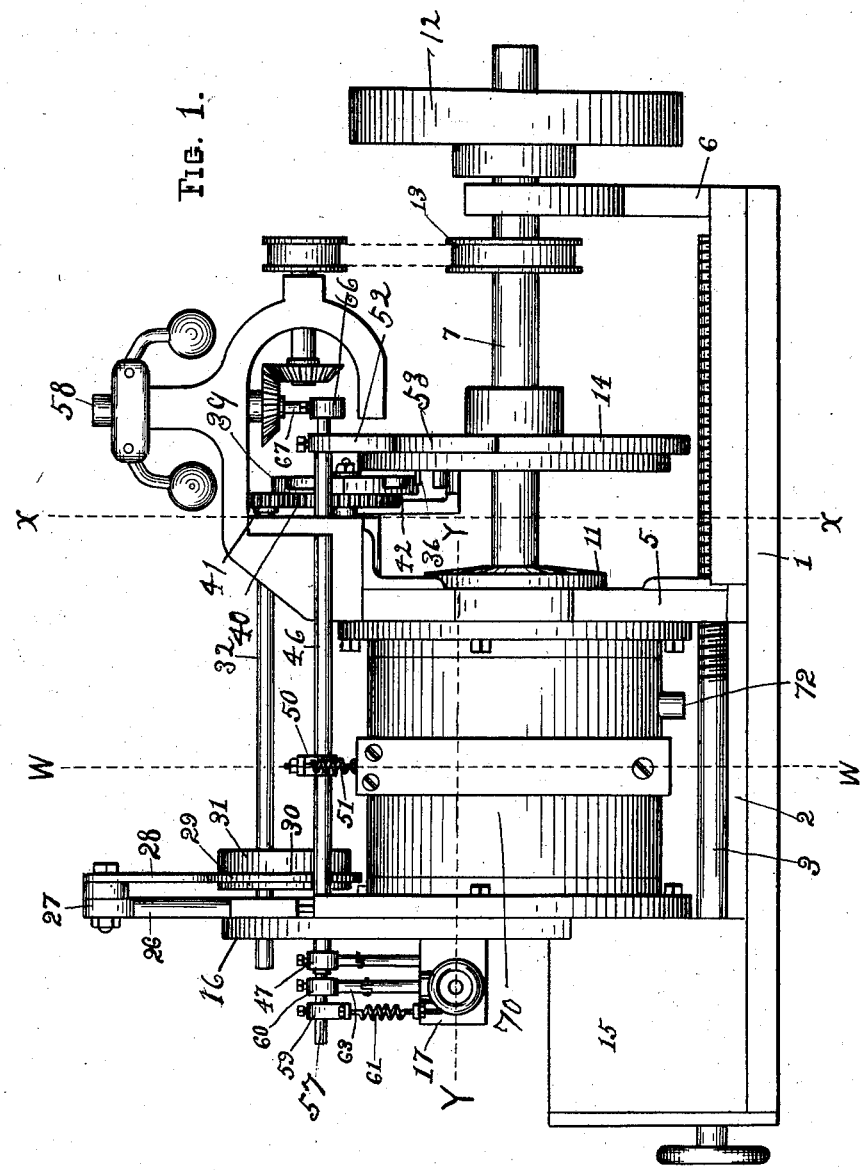
Figure 2:
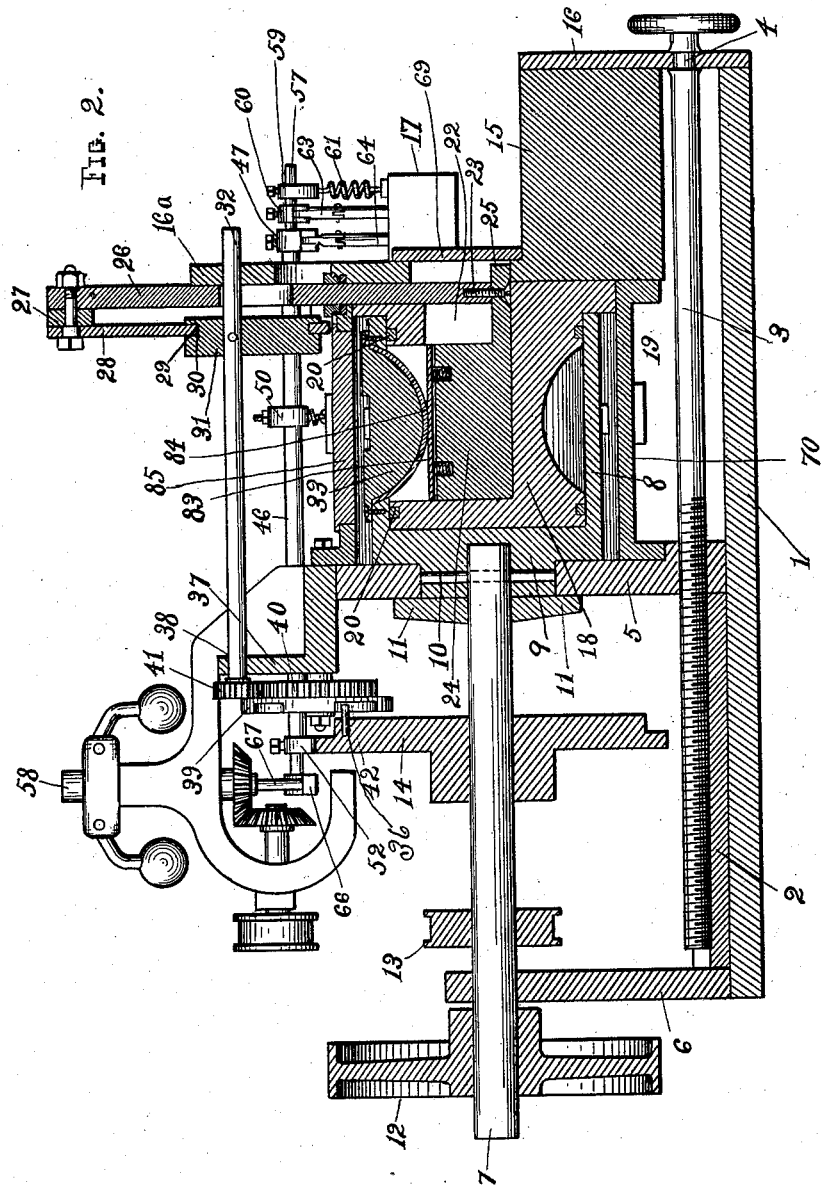
Figure 3:
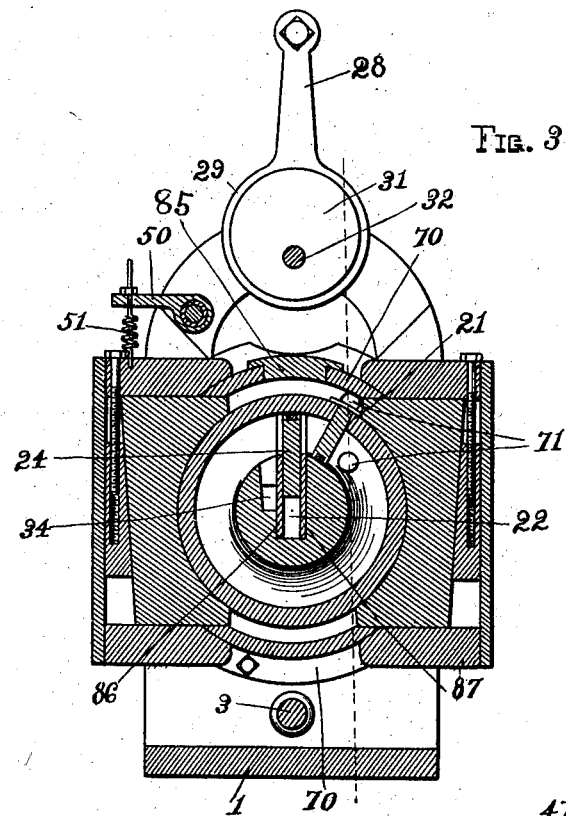
Figure 7:
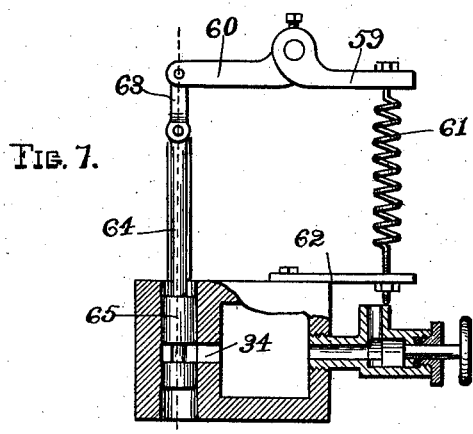
Figure 8:
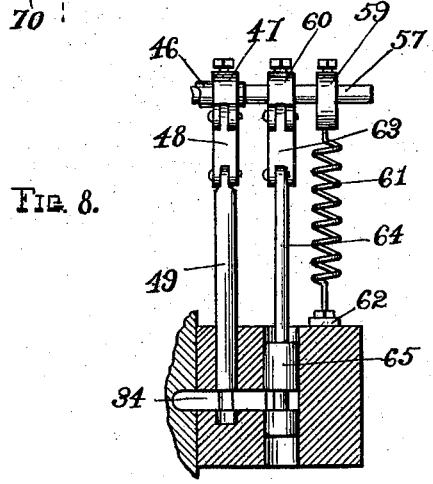
Figure 4:
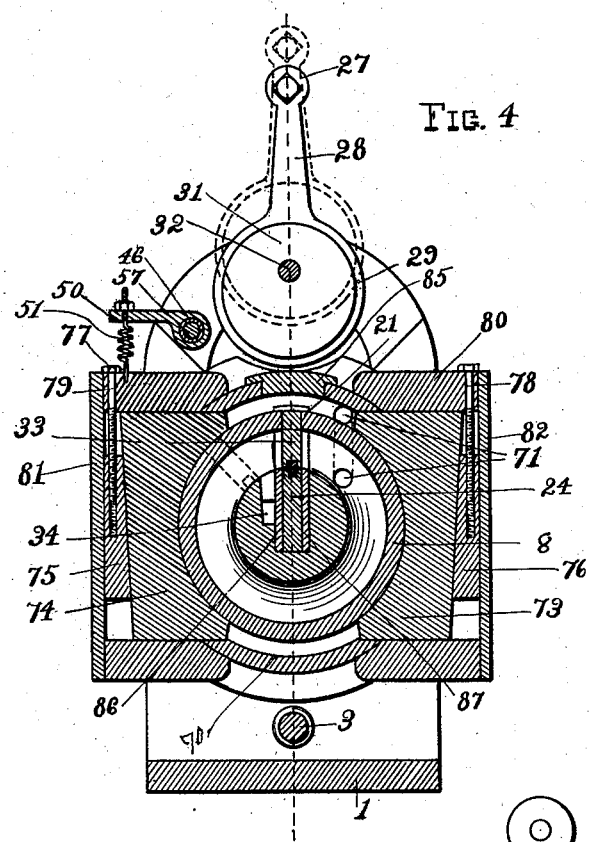
Figure 6:
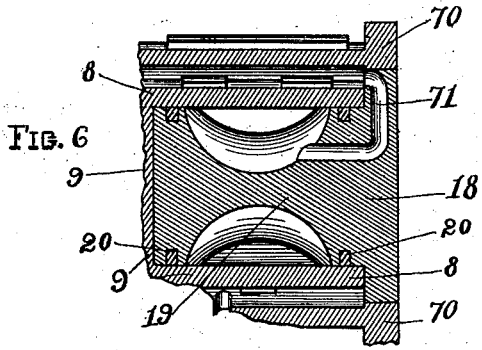
Figure 10:
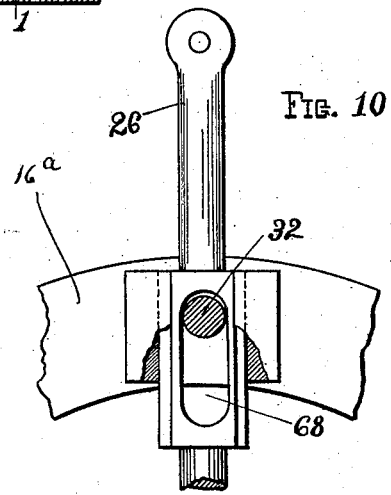

In the accompanying drawings, forming a part of the specification, Figure 1 is a side elevation of the engine, giving its general appearances when it is ready for use. Fig. 2 is a longitudinal horizontal sectional view taken centrally of Fig. 1, showing the general internal construction of the engine with the main driving-shaft in plan. Fig. 3 is a vertical cross-sectional view taken on line W W of Fig. 1, disclosing the position of the cut-off valves when the steam is escaping through the exhaust-port. Fig. 4 is a similar view showing the position of the valves just before the steam begins to enter the cylinders and the position in dotted lines of one of the valves when the steam begins to enter. Fig. 5 is a cross or vertical section taken on line X X of Fig. 1, disclosing a face view of a variable operating-disk which is adapted to control the movements of the cut-offs of the steam to and from the cylinder. Fig. 6 is a broken section disclosing a portion of the cylinder and the exhaust-port through which the steam escapes after its function has been performed. Fig. 7 is a vertical section of the steam-chest and the position of a throttle-valve connected thereto. Fig. 8 is a view, partly in section, of the same in a reverse position. Fig. 9 is a broken horizontal sectional view taken on line Y Y of Fig. 1, disclosing in part a fixed core around which a cylinder revolves, also the position in part of a vertically-reciprocating valve and the route of the steam from the steam-chest to the cylinder. Fig. 10 is a broken section in elevation of an extension of one of the end cylinder-walls, disclosing the position of a vertical shaft that controls the movement of the cut-off valves provided with an elongated slot that works loosely over a horizontal shaft. Fig. 11 is a vertical section of a hollow stem, disclosing in part the movements of the vertical governor-shaft. Fig. 12 is a spring-and-pintle actuated depending dog pivotally mounted to a bracket. The object of said dog is to assist in cutting off the steam while a segmental valve passes a given point, which will be fully described. Fig. 13 is a small serrated disk with right-angle furrows cut across its face, which will be fully described. Fig. 14 is a sectional view of the same, taken on line A A.

The bed portion of our invention is constructed slidable or longitudinally adjustable, the bottom portion of which is designated 1 and the top portion is designated 2. These two bed portions are arranged so that they can be taken apart or adjusted to any particularly longitudinal distance by means of a screw-threaded hand-bolt 3, as shown. This hand-bolt is loosely fixed at 4 of its outer end, the screw-threaded portion thereof passing through a vertical head-block 5, which is correspondingly screw-threaded. At the outer end of said adjustable portion 2 is a vertical journal-block 6. Said head-block 5 and journal-block 6 form journal-seats for the driving-shaft 7. Mounted and rigidly secured to the inner end of the driving-shaft 7 is a cylinder 8. The head 9 of said cylinder is recessed, as shown. Passing through said recess and through the end of the shaft is a toggle-pin 10, the object of said pin being to securely hold the shaft to the cylinder-head. The recessed portion of said cylinder-head is adapted to work loosely through an opening of the head-block 5. Secured to the said shaft and fitting snugly against the head-block 5 and the recessed end of said cylinder-head is a disk 11, which serves as a reinforcement to maintain an even movement of the shaft and the disk through the opening of the head-block 5. Mounted on the outer end of said shaft 7 is a balance-wheel 12, and mounted on said shaft, between the bearings thereof, is a pulley 13 and a disk 14. Said pulley and disk will be referred to farther on.

Rigidly secured to the end of the bed portion 1 is a head-block 15. Said head-block 15 is supported by a vertical extended end 16, secured to the bed portion 1 and the side pieces. (Indicated at Fig. 1.) Mounted on said head-block 15 and of corresponding width of said head-block is a vertical extension 16$^a$. Said extension extends upward of a sufficient height to form bearings for two horizontal shafts, which will be described farther on. Rigidly secured to said extension is a steam-chest 17, which will also be described farther on.

Mounted to the inside of head-block 15 and extension 16$^a$ is a core 18, horizontally and rigidly secured thereto. Said core is provided with a circumferential concave groove 19. Said core is further provided with two circumferential piston-rings 20, which are adapted to snugly fit the inside of cylinder 8.

Cylinder 8 is provided with an elongated opening 21 from its outer to the inner surface of about a half-inch in width and about two-thirds the length of the cylinder or correspondingly in length to the width of the circumferential concave groove at the outer surface of the core 18. Said elongated opening is clearly indicated at 21, Figs. 3 and 4. In said core is a channel or mortise 22, extending longitudinally from its outer surface down to about two-thirds of its diameter, or a little below the bottom of the circumferential groove the channel is laterally extended, as indicated by 23. To work loosely and snugly in said channel is a vertically-reciprocating valve 24. Said valve is provided with a lateral extension 25. Rigidly secured to said lateral extension and to valve 24 is a vertical valve-stem 26. Said valve-stem 26 is pivotally connected at its top end 27 by a shaft 28, which is provided with a ring 29 at its lower portion. Said ring is adapted to engage a circumferential groove 30 in the face of an eccentrically-rotating pulley 31. Said eccentric pulley 31 is rigidly secured to a horizontal shaft 32.

Referring back to the elongated opening 21 through the surface of the cylinder 8, we have provided a valve 33 of segmental configuration. Said valve is adapted to engage snugly through the said elongated opening 21, where it is rigidly secured. Said valve is further adapted to correspondingly engage the circumferential concave groove in the core 18. Said valve, being rigidly secured to the cylinder 8, travels around the core in the said circumferential groove, forming an abutment or bulkhead against the steam when it stands in the position of the dotted lines seen at Fig. 4—that is to say, when the valve 33, as illustrated at Fig. 4 in cross-section, stands over the dotted lines at the left in said figure the vertical reciprocating valve 24 will stand in the position as seen at Fig. 3. When the two valves just described are in this position, the steam will enter through steam-port 34 and force cylinder 8 to revolve around the core 18, said valve 24 making a down and up movement of each revolution of cylinder 8. These movements are effected as follows: Disk 14, secured to driving-shaft 7, is provided with two extended lugs 35 and 36, secured to its inner face, one of which being indicated in dotted lines. Secured to a bracket 37, which provides a bearing at 38 for shaft 32, is loosely mounted a serrated grooved-face disk 39. (Shown in detail at Fig. 13.) Secured to the opposite face of said disk from the slots is a cog-rim 40. Secured to the opposite end of shaft 32 from the eccentric pulley 31 is a pinion 41. Said pinion engages and meshes with cog-rim 40. When the steam enters through the steam-port 34, cylinder 8 (seen at Figs. 3 and 4) revolves to the left looking at it in the positions seen in these two figures. Driving-shaft 7, being rigidly secured to said cylinder 8, revolves also, and disk 14, being secured to said shaft, revolves with it. Extended lugs 35 and 36, secured to the inner face of disk 14, as seen at Fig. 5, (not shown in sectional view at Fig. 2,) engages slots 42 of disk 39. This produces a movement which causes shaft 32 to make one revolution to each revolution of the disk 14 by means of extended lug 35 first engaging one of the slots 42, which will cause shaft 32 and eccentric pulley 31 to revolve half-way around, and when pin 35 disengages its slot pin 36 engages the next succeeding slot, and when pin 36 disengages said succeeding slot shaft 32 has made one revolution. Said revolution causes valve 24 to make a down and up movement. When the down movement is effected of valve 24, segmental valve 33, which is rigid to cylinder 8, passes over said valve 24 to the position indicated in dotted lines at Fig. 4, when valve 24 immediately raises to the position seen in Fig. 3. At the same movement the steam-port 34 is opened, admitting the steam to enter between valve 24 and segmental valve 33. By this means cylinder 8 is kept in continuous motion around core 18. Pivotally and dependingly mounted to bracket 37 is a reciprocating spring-actuated dog 43. Said dog is adapted to engage and disengage the serrations 44 in the periphery of disk 39. (Seen at Figs. 5 and 13.) Secured to the lower end of dog 43 and bracket 37 is a coil-spring 45. The function of said dog will be explained farther on. Mounted on vertical extension 16$^a$ and bracket 37 is a hollow shaft 46. Mounted on the outer end of said hollow shaft is an oscillating dog 47. Pivotally and dependingly secured to the outer end of said dog is a link 48. Said link is pivotally connected to a plunger cut-off valve 49. Centrally and longitudinally of said shaft is another dog 50, rigidly secured thereto. Secured to the outer end of said dog and to a cylinder-jacket, which will be described later on, is a coil tension-spring 51. At the outer end of said shaft 46 is secured another dog 52. This dog engages the outer periphery of disk 14. Said disk 14 is provided with a cam 53.

The functional relations sustained and the object attained by the movements of disk 39, depending dog 43, disk 14, hollow shaft 46, oscillating dog 47, dog 50, dog 52, and cam 53 are the cutting off of the flow of the steam through steam-port 34 while segmental valve is traveling from the position shown in Fig. 3 until said valve reaches the position shown in dotted lines at Fig. 4. By this means the steam is checked while said segmental valve is passing over oscillating valve 24; otherwise if the steam was permitted to flow into the cylinder during this movement confusion would be the result. This movement is attained instantaneously, or nearly so, as disk 14, which carries pintle-blocks 54 and 55, runs at a high rate of speed. On each revolution of said disk said pintle-blocks come in contact with extension 55 of depending dog 43, which creates a down and up movement of the vertically-oscillating valve 24, and at the same time that the pintle-block 55 engages said depending dog dog 52 engages cam 53 at 56, which forces plunger cut-off valve 49 downward through steam-entering port 34, as indicated at Fig. 8. Said plunger, being of the same dimensions of said steam-entering port, checks the passage of steam thereof until said segmental valve 21 moves from the position shown in Fig. 3 until it reaches the position shown in dotted lines, Fig. 4, which has been already described, and when cam 53 passes from under dog 52 said dog is forced back to the periphery of cam 14 by means of tension-spring 51 being connected to the outer end of dog 50, when plunger-valve 59 is raised from steam-port 34 and steam admitted on its full free course to the cylinder. Passing through said hollow oscillating shaft 46 is an oscillating shaft 57. The function of said shaft is attained by the movements of the governor 58, said movements being controlled by the speed of the engine. Secured to the outer end of said shaft 57 are two oscillating dogs 59 and 60. Secured to dog 59 is a coil tension-spring 61. The lower end thereof is connected to an extended bracket 62.

At the outer end of oscillating dog 60 and pivotally secured thereto is a depending link 63. Said depending link is pivotally connected to a vertical cut-off valve-stem 64. Said valve-stem 64 is secured to a circumferential groove-valve 65. Said groove on the down and up movements of the valve is adapted to engage steam-port 34 more or less, which will automatically check or increase the flow of the steam to the engine, as occasion may demand. At the opposite end of said shaft 57 is another dog 66 inverted. Said dog 66 is adapted to engage the lower end of the vertically-oscillating governor-stem 67. As the governor-balls oscillate up and down, according to the speed of the engine, governor-stem 67 is raised and lowered by means of tension-spring 61, said shaft 57, upon which dog 60 is mounted, is caused to oscillate. This oscillation effects an oscillating movement of link 63, valve-stems 64, and circumferential grooved valve 65, which gages or governs the flow of steam to the engine.

Referring back to oscillating valve-stem 26, said stem is provided with an elongated opening 68. Through this opening shaft 32 passes, and the object of the opening is to permit said valve-stem to make its up and down strokes without coming in contact with said shaft.

The channel 22 in the core 18, which has already been partially described, extends outward through extension 16$^a$ of head-block 15. The object of this extension is to admit the oscillating valve 24 of being removed and replaced in its seat or channel 22 of said core 18. We have further provided a plate 69 to close over the opening in extension 16$^a$ when the valve is in its position. We have further provided a steam-jacket 70, which encircles rotating cylinder 8. Said jacket when in position is firmly bolted to and between head-blocks 15 and head-blocks 5. One object of said steam-jack when in the position seen at Fig. 1 is to more firmly support said head-blocks to prevent vibration when the engine is in motion. Another object of said steam-jacket is to retain a volume of hot steam around and over the revolving cylinder 8, which will prevent in a certain degree the condensation of the steam while it is performing its function before passing out of the exhaust-port 71 and discharging between cylinder 8 and jacket 70. (Clearly indicated at Fig. 6.) The final exhaust of the steam from the engine is through pipe 72. (Seen at the lower portion of steam-jacket at Fig. 1.) Another important object of the steam-jacket is to carry and support two cylinder-guides 73 and 74. These guides are inserted through openings in the steam-jacket central thereof and are adapted to snugly engage the steam-cylinder, as indicated at Fig. 4, and are supported in this position by means of sliding blocks 75 and 76. Said slide-blocks are adapted to slidingly impinge said guide-blocks by means of screw-bolts 77 and 78, passing down through the top of the guide-boxes 79 and 80, the lower ends of said screw-bolts entering the sliding blocks, and by turning the said bolts either way the desired tension is acquired between the guide-blocks and the cylinder. We have further provided slide-bars 81 and 82. These slide-bars are secured by screws over the openings passing through the steam-jacket to the cylinder and forming a bearing for the outer edges of the slide-blocks 75 and 76. We have further provided a spring-actuated longitudinal packing 83, secured to oscillating valve 24. The object of this packing is to impinge snugly the inside of the cylinder 8 when the engine is in operation. We have further provided a segmental packing 84, which correspondingly engages valve 33.

In the top portion of the steam-jacket is a hand-hole and a cap 85 neatly engaging and covering the hole. The object of this hand-hole is to readjust the segmental valve, which is rigidly secured through the opening of the cylinder, already described.

Loosely inserted in the channel 22 of the core, which is adapted to let the oscillating valve 24 move loosely up and down between them, are two washer-plates of the same linear dimensions as the sides of the channel. The object of said plates is to protect the walls of the channel when the valve is in motion, and, further, when they become worn they can be replaced with new ones.

Having now fully described our invention, what we claim as new, and desire to secure by Letters Patent of the United States, is—

1. In a rotary engine of the character described, the combination in a suitable bed, head-blocks supported on said bed, a stationary concave core mounted on one of the head-blocks, a channel cut in said core, a valve adapted to engage and disengage said channel, a cylinder adapted to engage loosely and rotate over said core, a segmental valve carried by said cylinder and adapted to engage the concave groove in said core, a journal-block mounted at the other end of said bed, a shaft mounted on said journal-block at one end and rigidly mounted to the cylinder at the opposite end, substantially as described.

2. In a rotary engine of the character described, of a suitable bed, head-blocks and a vertical journal-block supported on said bed, a concaved channeled core rigidly mounted to one of the head-blocks, an oscillating valve adapted to engage and disengage said channel, a horizontal shaft carrying pulleys adapted to rotate mounted on the other head-block and the vertical journal-block, a cylinder rigidly mounted on one end of said shaft and adapted to telescopically engage said concaved channeled core, a segmental valve carried by said cylinder adapted to engage the concave groove in said core, substantially as described.

3. In a rotating steam-engine of the character described of a suitable bed portion, head-blocks and a journal-block supported on said bed, a concaved circumferential grooved channeled core mounted on one of the head-blocks, a driving-shaft mounted on the other head-block and the journal-block, a cylinder and a disk mounted on the shaft, pintle-blocks, lug-pins and a cam carried by said disk, a bracket mounted on the head-block 5, a channeled faced serrated disk and a depending spring-actuated dog supported on the bracket, the channels adapted to be engaged by said lug-pins, serrations engaged by the upper end of the dog, the lower end of said dog adapted to engage said pintle-blocks, a cog-rim secured to the opposite side of the disk, a shaft 32, a pinion mounted on one end of said shaft adapted to engage the cog-rim, an eccentric grooved pulley mounted near the opposite end, a ring with an extended portion engaging the groove, the extension engaging a vertical valve-stem and adapted to give valve 24 proper oscillation, substantially as described.

4. In a rotary steam-engine of the character described, of a suitable bed portion, head-blocks and a journal-block supported on the bed, a grooved channeled core mounted to one of the head-blocks, a driving-shaft supported on the opposite head-block and the journal-block, a cylinder and a disk mounted on the shaft, the cylinder adapted to engage the core, pintle-blocks, lug-pins and a cam carried by said disk, a serrated channeled disk, and a depending spring-actuated dog mounted opposite to the disk, said channels engaged by the lug-pins, the pintle-blocks engaging the spring-actuated dog, a horizontal shaft 32, a pinion mounted on one end thereof, and an eccentric grooved pulley near the opposite end, the pinion engaging a cog-rim carried by the serrated channeled disk, an eccentric ring with an extended portion engaging the groove, a valve engaging the channel in the core, a vertical valve-stem engaged by the valve at its lower end and engaging the eccentric ring extension at its upper end, a horizontal hollow shaft 46, a dog mounted on one end of said shaft and adapted to engage the cam carried by disk mounted to the driving-shaft, a dog mounted at the opposite end and adapted to impart vertical movement to valve 49, a spring-actuated dog 50 mounted central of said shaft adapted to impart oscillating movement thereto, substantially as described.

5. In a steam rotating engine of the character described a suitable bed, head-blocks and a journal-block mounted on the bed, a stationary core secured to one of the head-blocks, a driving-shaft mounted on the opposite head-block and the journal-block, a cylinder and a disk mounted on the shaft, a valve carried by the cylinder, pintle-blocks, lug-pins, and a cam carried by the disk, a channel serrated disk, and a depending spring-actuated dog mounted opposite to said disk, a shaft 32 a pinion mounted on one end and adapted to engage a cog-rim carried by channeled serrated disk, an eccentric pulley mounted on the opposite end adapted to impart vertical movement to valve 24, a horizontal shaft passing through hollow shaft 46, a spring-actuated dog 59 on one end thereof and an inverted dog at the opposite end, a dog 60 mounted near the first-mentioned end of said shaft adapted to impart oscillating movement to cut-off valve 65, substantially as described.

6. In a rotating steam-engine, the combination of the character described, a suitable bed, head-blocks mounted on said bed, a channeled concaved core carried by one of the head-blocks, a cylinder adapted to rotate around said core, a valve carried by said cylinder and adapted to correspondingly engage the concaved portion thereof, a vertically-oscillating valve adapted to engage and disengage said channel, adjustable web-packing mounted on said valve and adapted to engage the inside of the cylinder, substantially as described.

7. In a rotary steam-engine of the character described, the combination of an adjustable bed portion, head-blocks mounted on said adjustable bed, a concave core mounted to one of the head-blocks, a cylinder adapted to rotate around said core, a valve carried by said cylinder, a web-packing secured to said valve and adapted to engage the channeled concave core, a valve adapted to engage said channel, a hollow shaft carried by extended head-block at one end and a bracket at the opposite end, oscillating dogs secured to each end of said shaft and adapted to oscillate by means of the cam secured to disk 14, a depending steam-cut-off valve actuated by oscillating dog 47, substantially as described.

8. In a rotating steam-engine, the combination of the character described, of a bed portion, head-blocks mounted on said bed, a stationary grooved channeled core mounted to one of the head-blocks, an oscillating valve adapted to actuate in said channel, a horizontal shaft 32 mounted on head-block extension at one end and a bracket at the opposite end a valve adapted to engage said channel, a vertical valve-stem secured to said valve, provided with an elongated opening adapted to accommodate its up-and-down movements over shaft 32, an eccentric grooved pulley secured to said shaft, a ring extension and ring adapted to engage said groove in the eccentric pulley, a ring extension pivotally secured to the top end of valve-stem adapted to cause the oscillating movement of said stem by means of the rotation of said eccentric pulley, substantially as described.

9. In a rotating steam-engine of the character described a suitable bed portion, head-blocks carried by said bed, a concaved grooved channeled core mounted to one of said blocks a cylinder adapted to telescope and rotate around said core a driving-shaft mounted to said cylinder, a valve adapted to engage the channel in said core, a valve-stem connected to said valve, a ring extension pivotally secured at the top of valve-stem, a shaft, an eccentrically-grooved pulley mounted on said shaft, a ring carried by said ring extension adapted to engage said groove, a pinion on one end of said shaft, a grooved faced serrated disk pivotally mounted to bracket carried by one of the head-blocks, a cog-rim secured to said disk and meshing with pinion secured to shaft 32, substantially as described.

10. In a rotary engine of the character described, an adjustable bed portion, head-blocks and a journal-block supported on said bed, a circumferential concaved channeled core mounted to one of the head-blocks, an oscillating valve adapted to engage said channel, a shaft carrying pulleys mounted on the other head-block and the journal-block a cylinder and a disk mounted on the shaft, said cylinder adapted to telescopically engage and rotate around said core, a vertical valve-stem engaging the oscillating valve at its lower end, and means for producing oscillating movements of the valve-stem and the valve, substantially as described.

11. In a rotary engine of the character described, of a suitable bed, head-blocks supported on said bed, a rotating cylinder mounted on one of said blocks, a driving-shaft mounted to said cylinder at one end and a vertical journal-block near the outer end, a concaved grooved channeled core mounted to the opposite head-block from the first mentioned head-block and adapted to snugly be engaged by the inside of the rotating cylinder, a horizontal shaft mounted on the inside of a hollow shaft, a pair of oppositely-extending oscillating dogs secured to the outer end of said shaft, one adapted to be actuated by a coil-spring, the other one adapted to actuate and control the flow of steam to the engine, an oscillating dog mounted at opposite end of said shaft and adapted to oscillate and be engaged by a governor-stem, substantially as described.

12. In a rotary engine of the character described, the combination of a suitable bed, head-blocks and a journal-block mounted on said bed, a circumferential grooved channeled core, carried by one of the head-blocks, a driving-shaft carrying pulleys mounted on the other head-block and the journal-block, a cylinder mounted on the inner end, adapted to telescopically engage and rotate around said core, an oscillating valve adapted to engage the channel a segmental valve carried by said cylinder, a valve-stem secured to the oscillating valve at its lower end, a horizontal shaft, an eccentrical pulley mounted on said shaft, a vertical shaft 28 provided with a ring portion engaging said eccentric pulley, the extended end portion engaging the upper end of valve-stem 26, and means for producing movements of said stem and shaft, substantially as described.

13. In a rotating steam-engine of a suitable bed portion carrying supports mounted on said bed portion, a circumferential concaved grooved channeled core carried by one of said carrying portions, a cylinder adapted to telescopically engage said core carried by the opposite carrying-support, a cylindrical steam-jacket loosely surrounding the rotating cylinder and the core secured to the carrying-supports, cylindrical guide-blocks adjustably carried by said steam-jacket engaging the rotating cylinder, vertically-arranged sliding blocks engaging said guide-blocks, substantially as described.

14. In a rotating steam-engine of the character described the combination of a suitable bed portion, head-blocks and a journal-support mounted on said bed, a concave grooved channeled core mounted on one of the head-blocks, a rotating cylinder adapted to telescope and rotate around said core, an oscillating valve adapted to move up and down in said channel, washer-plates adapted to engage between said valves and the walls of the channel, substantially as described.

In testimony whereof we affix our signatures in the presence of two witnesses.

DAVID P. FUQUA, Sr.
FRED. C. BUEHLER, Jr.

Witnesses:
O. M. VAN DORSTON,
GEO. H. ROBERTS.